United States Patent
Deng

(10) Patent No.: US 9,367,303 B2
(45) Date of Patent: Jun. 14, 2016

(54) UPGRADE PACKET GENERATION METHOD, SERVER, SOFTWARE UPGRADE METHOD, AND MOBILE TERMINAL

(71) Applicant: HUIZHOU TCL MOBILE COMMUNICATION CO.,LTD, District Huizhou, Guangdong (CN)

(72) Inventor: Tiejun Deng, District Huizhou (CN)

(73) Assignee: Huizhou TCL Mobile Communication Co., Ltd, Huizhou (CN)

( * ) Notice: Subject to any disclaimer, the term of this patent is extended or adjusted under 35 U.S.C. 154(b) by 0 days.

(21) Appl. No.: 14/440,514

(22) PCT Filed: Apr. 25, 2014

(86) PCT No.: PCT/CN2014/076173
§ 371 (c)(1),
(2) Date: May 4, 2015

(87) PCT Pub. No.: WO2015/003516
PCT Pub. Date: Jan. 15, 2015

(65) Prior Publication Data
US 2015/0277898 A1    Oct. 1, 2015

(30) Foreign Application Priority Data
Jul. 8, 2013   (CN) .......................... 2013 1 0285388

(51) Int. Cl.
*G06F 9/44* (2006.01)
*G06F 9/445* (2006.01)

(52) U.S. Cl.
CPC .. *G06F 8/68* (2013.01); *G06F 8/65* (2013.01); *G06F 8/665* (2013.01)

(58) Field of Classification Search
None
See application file for complete search history.

(56) References Cited

U.S. PATENT DOCUMENTS

| 7,665,081 B1 * | 2/2010 | Pavlyushchik | G06F 8/68 707/770 |
| 7,676,506 B2 * | 3/2010 | Reinsch | G06F 8/68 707/695 |

(Continued)

FOREIGN PATENT DOCUMENTS

| CN | 102053853 A | 5/2011 |
| CN | 102841794 A | 12/2012 |

(Continued)

OTHER PUBLICATIONS

Bing et al., "A Fast and Secure Framework for Over-the-Air Wireless Software Download Using Reconfigurable Mobile Devices," 2006, IEEE Communications Magazine Jun. 2006, pp. 58-63.*

(Continued)

*Primary Examiner* — Thuy Dao
*Assistant Examiner* — Stephen Berman
(74) *Attorney, Agent, or Firm* — Ladas & Parry LLP

(57) ABSTRACT

A method of generating a Firmware Over-The-Air (FOTA) upgrade package is disclosed, comprising: determining whether a file having a same filename or being similar as a file in a software package of a new version exists in a software package of an old version; when there exists a file having a same filename or a similar file, generating a difference file between the file in the software package of the old version and the file in the software package of the new version and adding the difference file into the FOTA upgrade package, and when there doesn't exist a file having a same filename or a similar file, adding the file in the software package of the new version into the FOTA upgrade package. An FOTA upgrading method, a server, and a mobile terminal are also disclosed.

15 Claims, 5 Drawing Sheets

(56) References Cited

U.S. PATENT DOCUMENTS

| | | | |
|---|---|---|---|
| 8,713,137 B2* | 4/2014 | Ji | G06F 8/68 709/221 |
| 2004/0098427 A1* | 5/2004 | Peng | G06F 8/665 |
| 2005/0022175 A1* | 1/2005 | Sliger | G06F 8/68 717/169 |
| 2005/0257205 A1* | 11/2005 | Costea | G06F 8/65 717/168 |
| 2010/0145906 A1* | 6/2010 | Milin | G06F 8/65 707/609 |
| 2011/0055155 A1* | 3/2011 | Page | G06F 8/68 707/625 |
| 2014/0123120 A1* | 5/2014 | Holmberg | G06F 8/665 717/168 |

FOREIGN PATENT DOCUMENTS

| | | |
|---|---|---|
| CN | 103136013 A | 6/2013 |
| CN | 103336703 A | 10/2013 |

OTHER PUBLICATIONS

Platen et al., "Feedback linking: optimizing object code layout for updates," 2006, Proceedings of the 2006 ACM SIGPLAN/SIGBED conference on Language, compilers, and tool support for embedded systems, vol. 41, Issue 7, pp. 2-11.*

Kim et al., "Remote progressive firmware update for flash-based networked embedded systems," 2009, Proceedings of the 2009 ACM/IEEE international symposium on Low power electronics and design, pp. 407-412.*

* cited by examiner

UPGRADE PACKET GENERATION METHOD, SERVER, SOFTWARE UPGRADE METHOD, AND MOBILE TERMINAL

RELATED APPLICATION

This application claims all benefits accruing under 35 U.S.C. §119 from China Patent Application No. 201310285388X, filed on Jul. 8, 2013 in the China Intellectual Property Office, the disclosure of which is incorporated herein by reference.

FIELD OF THE INVENTION

The present disclosure generally relates to the technical field of software upgrading, and more particularly, to a method of generating a Firmware Over-The-Air (FOTA) upgrade package, a server, an FOTA upgrading method, and a mobile terminal.

BACKGROUND OF THE INVENTION

Mobile terminals have a large amount of software installed therein, and the software often needs to be upgraded so that the users can experience and use the software in a better way. Firmware Over The Air (FOTA) upgrading is a method commonly used to upgrade software in mobile terminals, and can upgrade software simply and quickly. The FOTA upgrading is mainly as follows: a difference file corresponding to differences between a file of a software package of an old version and the same file of the software package of a new version is generated according to a differential algorithm, and then the difference file is added into an FOTA upgrade package to achieve upgrading of the software.

The present inventor has found in the long-term research and development that, in the conventional method of generating an FOTA upgrade package, the difference file can only be generated for files having the same filename in the software packages of the old version and the new version; and for two files having different filenames but similar contents, a different file cannot be generated. Thus, what can be done is only to add the whole file, which has a different filename but similar contents, of the software package of the new version into the FOTA upgrade package. This makes the volume of the FOTA upgrade package larger, and increases the traffic and time taken to download the FOTA upgrade package into the mobile terminal.

SUMMARY OF THE INVENTION

To at least partly solve the aforesaid problems, the present disclosure proposes a method of generating an FOTA upgrade package, a server, an FOTA upgrading method, and a mobile terminal, which can reduce the volume of the FOTA upgrade package and further reduce the traffic and time taken to download the FOTA upgrade package.

To solve the aforesaid technical problems, a first technical solution adopted in the present disclosure is as follows: a method of generating a Firmware Over-The-Air (FOTA) upgrade package, comprising the following steps of:

determining, by a server, whether a file having a same filename as a file in a software package of a new version exists in a software package of an old version;

if there is a file having the same filename, then generating, by the server, a difference file between the file in the software package of the old version and the file in the software package of the new version and adding, by the server, the difference file into the FOTA upgrade package; and if there is not a file having the same filename, then continuing to determine whether a file similar to the file in the software package of the new version exists in the software package of the old version; and if there is a similar file, then generating, by the server, a difference file between the file in the software package of the old version and the file in the software package of the new version and adding, by the server, the difference file into the FOTA upgrade package; and if there is not a similar file, then adding the file in the software package of the new version into the FOTA upgrade package, wherein the FOTA upgrade package is used to upgrade software of a mobile terminal from the old version of the software package into the new version of the software package.

In one embodiment, the step of determining, by a server, whether a file having a same filename as a file in a software package of a new version exists in a software package of an old version specifically comprises the following steps of:

scanning, by the server, filenames and file attributes of files in the software package of the old version and the software package of the new version to obtain type file lists of the software package of the old version and all type file lists of the software package of the new version, wherein each of the type file lists comprises filenames of files of a same type;

determining, by the server, whether traversing of a current type file list in the software package of the new version has been finished; and if the answer is "yes", continuing to determine whether traversing of a next type file list in the software package of the new version has been finished, and otherwise, if the answer is "no", acquiring a filename having not been traversed from the current type file list in the software package of the new version;

determining, by the server, whether traversing of the current type file list in the software package of the old version has been finished; and if the answer is "yes", continuing to determine whether traversing of the current type file list in the software package of the new version has been finished, and otherwise, if the answer is "no", acquiring a filename having not been traversed from the current type file list in the software package of the old version and determining whether the filename is the same as the filename having not been traversed that is acquired from the current type file list in the software package of the new version, and if the filename is the same, then adding the corresponding filename into an old-and-new-coexisting list; and continuing to traverse the current type file list in the software package of the new version by the server after the corresponding filename has been added into the old-and-new-coexisting list.

In one embodiment, the step of determining whether a file similar to the file in the software package of the new version exists in the software package of the old version specifically comprises the following steps of:

if the filename having not been traversed that is acquired from the current type file list in the software package of the old version is not the same as the filename having not been traversed that is acquired from the current type file list in the software package of the new version, then determining whether a file corresponding to the filename having not been traversed that is acquired from the current type file list in the software package of the old version is similar to the file corresponding to the filename having not been traversed that is acquired from the current type file list in the software package of the new version;

if it is similar, then adding, by the server, the filename having not been traversed that is acquired from the current type file list in the software package of the old version and the filename having not been traversed that is acquired from the current type file list in the software package of the new version into a similar file list;

continuing to traverse the current type file list in the software package of the new version by the server after the filenames have been added into the similar file list; and if it is not similar, then continuing to traverse the current type file list in the software package of the old version by the server.

In one embodiment, the step of determining whether a file corresponding to the filename having not been traversed that is acquired from the current type file list in the software package of the old version is similar to the file corresponding to the filename having not been traversed that is acquired from the current type file list in the software package of the new version specifically comprises the following steps of:

generating, by the server, a difference file between the file corresponding to the filename having not been traversed that is acquired from the current type file list in the software package of the old version and the file corresponding to the filename having not been traversed that is acquired from the current type file list in the software package of the new version;

further acquiring, by the server, a file of a smaller volume from the file corresponding to the filename having not been traversed that is acquired from the current type file list in the software package of the old version and the file corresponding to the filename having not been traversed that is acquired from the current type file list in the software package of the new version; and determining, by the server, whether a difference in volume between the difference file and the file of the smaller volume is smaller than 50% of the file volume of the file of the smaller volume, and if the answer is "yes", the files are similar files, and otherwise, they are not similar files.

In one embodiment, the step of, if there is a file having the same filename, then generating, by the server, a difference file between the file in the software package of the old version and the file in the software package of the new version specifically comprises the following steps of:

scanning, by the server, filenames of files in the software package of the new version to obtain a file list of the software package of the new version;

determining, by the server, whether traversing of the file list of the software package of the new version has been finished, and if the answer is "no", then acquiring, by the server, a filename having not been traversed from the file list of the software package of the new version;

further determining, by the server, whether the filename having not been traversed exists in the old-and-new-coexisting list; and if the filename having not been traversed exists in the old-and-new-coexisting list, then determining, by the server, whether contents of the file corresponding to the filename in the software package of the old version are consistent with contents of the file corresponding to the filename in the software package of the new version, and if the contents are inconsistent with each other, then generating a difference file between the file corresponding to the filename in the software package of the old version and the file corresponding to the filename in the software package of the new version and adding the filenames of the files in the software packages of the old version and the new version as well as a filename of the difference file into a difference file list; and continuing to traverse the file list of the software package of the new version if the contents are consistent with each other.

In one embodiment, the step of, if there is a similar file, then generating, by the server, a difference file between the file in the software package of the old version and the file in the software package of the new version specifically comprises the following steps of:

if the filename having not been traversed does not exist in the old-and-new-coexisting list, then determining, by the server, whether the filename having not been traversed exists in the similar file list;

if the filename having not been traversed exists in the similar file list, then determining, by the server, whether contents of the file, which corresponds to the filename having not been traversed in the similar file list, in the software package of the new version are consistent with contents of the file, which corresponds to the filename having not been traversed in the similar file list, in the software package of the old version, and if the contents are inconsistent with each other, then generating a difference file between the file, which corresponds to the filename having not been traversed in the similar file list, in the software package of the new version and the file, which corresponds to the filename having not been traversed in the similar file list, in the software package of the old version and adding the filenames of the files in the software packages of the old version and the new version as well as the filename of the difference file into the difference file list;

if the contents are consistent with each other, then continuing to traverse the file list of the software package of the new version;

adding the difference file list into the FOTA upgrade package by the server after the filenames of the files in the software packages of the old version and the new version as well as the filename of the difference file have been added into the difference file list;

if traversing of the file list of the software package of the new version has been finished, then scanning the filenames of the files in the software package of the old version by the server to obtain a file list of the software package of the old version; and deleting from the file list of the software package of the old version filenames which are the same as filenames in the old-and-new-coexisting list to obtain a deleted file list and adding the deleted file list into the FOTA upgrade package by the server.

In one embodiment, the step of adding the file in the software package of the new version into the FOTA upgrade package specifically comprises:

if the filename having not been traversed does not exist in the similar file list, then adding the file in the software package of the new version that corresponds to the filename having not been traversed into the FOTA upgrade package.

To solve the aforesaid technical problems, a second technical solution adopted in the present disclosure is: an FOTA upgrading method, comprising the following steps of:

decompressing an FOTA upgrade package by a mobile terminal, wherein the FOTA upgrade package is generated by a server through determining whether a file in a software package of an old version has a same filename as a file in a software package of a new version and whether a file in the software package of the old version is similar to the file in the software package of the new version; and using the decompressed FOTA upgrade package to upgrade the software from the old version to the new version by the mobile terminal In one embodiment, the mobile terminal decompresses the FOTA upgrade package to obtain a difference file list, a deleted file list, difference files, and files in the software package of the new version that are added in a verbatim mode.

In one embodiment, the step of using the decompressed FOTA upgrade package to upgrade the software from the old version to the new version by the mobile terminal specifically comprises the following steps of:

writing, by the mobile terminal, the files in the software package of the new version that are added in the verbatim mode into the mobile terminal;

determining, by the mobile terminal, whether traversing of the difference file list has been finished;

if the traversing of the difference file list has not been finished, then acquiring, by the mobile terminal, a description having not been traversed from the difference file list;

using, by the mobile terminal, the description having not been traversed to generate a file in the software package of the new version;

writing, by the mobile terminal, the file in the software package of the new version into the mobile terminal;

if the traversing of the difference file list has been finished, then determining, by the mobile terminal, whether traversing of the deleted file list has been finished;

if the traversing of the deleted file list has not been finished, then acquiring, by the mobile terminal, a filename having not been traversed from the deleted file list; and deleting a file stored in the mobile terminal, which corresponds to the filename having not been traversed and acquired from the deleted file list, from the mobile terminal by the mobile terminal.

To solve the aforesaid technical problems, a third technical solution adopted in the present disclosure is: a server for generating an FOTA upgrade package, comprising:

a filename determining module, being configured to determine whether a file having a same filename as a file in a software package of a new version exists in a software package of an old version;

a difference file generating module, being configured to, if there is a file having the same filename, generate a difference file between the file in the software package of the old version and the file in the software package of the new version;

an upgrade package generating module, being configured to add the difference file into the FOTA upgrade package; and a similar file determining module, being configured to, if there is not a file having the same filename, determine whether a file similar to the file in the software package of the new version exists in the software package of the old version;

the difference file generating module is further configured to, if there is a similar file, generate a difference file between the file in the software package of the old version and the file in the software package of the new version, the upgrade package generating module is further configured to add the difference file into the FOTA upgrade package, the upgrade package generating module is further configured to, if there is not a similar file, add the file in the software package of the new version into the FOTA upgrade package, wherein the FOTA upgrade package is used to upgrade software of a mobile terminal from the old version of the software package into the new version of the software package.

In one embodiment, the filename determining module is specifically configured to:

scan filenames and file attributes of files in the software package of the old version and the software package of the new version to obtain type file lists of the software package of the old version and all type file lists of the software package of the new version, wherein each of the type file lists comprises filenames of files of a same type;

determine whether traversing of a current type file list in the software package of the new version has been finished; and if the answer is "yes", continue to determine whether traversing of a next type file list in the software package of the new version has been finished, and otherwise, if the answer is "no", acquire a filename having not been traversed from the current type file list in the software package of the new version;

determine whether traversing of the current type file list in the software package of the old version has been finished; and if the answer is "yes", continue to determine whether traversing of the current type file list in the software package of the new version has been finished, and otherwise, if the answer is "no", acquire a filename having not been traversed from the current type file list in the software package of the old version and determine whether the filename is the same as the filename having not been traversed that is acquired from the current type file list in the software package of the new version, and if the filename is the same, then add the corresponding filename into an old-and-new-coexisting list; and continue to traverse the current type file list in the software package of the new version after the corresponding filename has been added into the old-and-new-coexisting list.

In one embodiment, the similar file determining module is specifically configured to:

if the filename having not been traversed that is acquired from the current type file list in the software package of the old version is not the same as the filename having not been traversed that is acquired from the current type file list in the software package of the new version, then determine whether a file corresponding to the filename having not been traversed that is acquired from the current type file list in the software package of the old version is similar to the file corresponding to the filename having not been traversed that is acquired from the current type file list in the software package of the new version;

if it is similar, then add the filename having not been traversed that is acquired from the current type file list in the software package of the old version and the filename having not been traversed that is acquired from the current type file list in the software package of the new version into a similar file list;

continue to traverse the current type file list in the software package of the new version after the filenames have been added into the similar file list; and if it is not similar, then continue to traverse the current type file list in the software package of the old version.

In one embodiment, the similar file determining module is specifically further configured to:

generate a difference file between the file corresponding to the filename having not been traversed that is acquired from the current type file list in the software package of the old version and the file corresponding to the filename having not been traversed that is acquired from the current type file list in the software package of the new version;

further acquire a file of a smaller volume from the file corresponding to the filename having not been traversed that is acquired from the current type file list in the software package of the old version and the file corresponding to the filename having not been traversed that is acquired from the current type file list in the software package of the new version; and determine whether a difference in volume between the difference file and the file of the smaller volume is smaller than 50% of the file volume of the file of the smaller volume, and if the answer is "yes", the files are similar files, and otherwise, they are not similar files.

In one embodiment, the difference file generating module is specifically further configured to:

scan filenames of files in the software package of the new version to obtain a file list of the software package of the new version;

determine whether traversing of the file list of the software package of the new version has been finished, and if the answer is "no", then acquire a filename having not been traversed from the file list of the software package of the new version;

further determine whether the filename having not been traversed exists in the old-and-new-coexisting list; and if the filename having not been traversed exists in the old-and-new-coexisting list, then determine whether contents of the file corresponding to the filename in the software package of the old version are consistent with contents of the file corresponding to the filename in the software package of the new version, and if the contents are inconsistent with each other, then generate a difference file between the file corresponding to the filename in the software package of the old version and the file corresponding to the filename in the software package of the new version and add the filenames of the files in the software packages of the old version and the new version as well as a filename of the difference file into a difference file list; and continue to traverse the file list of the software package of the new version if the contents are consistent with each other.

In one embodiment, the difference file generating module is specifically configured to:

if the filename having not been traversed does not exist in the old-and-new-coexisting list, then determine whether the filename having not been traversed exists in the similar file list;

if the filename having not been traversed exists in the similar file list, then determine whether contents of the file, which corresponds to the filename having not been traversed in the similar file list, in the software package of the new version are consistent with contents of the file, which corresponds to the filename having not been traversed in the similar file list, in the software package of the old version, and if the contents are inconsistent with each other, then generate a difference file between the file, which corresponds to the filename having not been traversed in the similar file list, in the software package of the new version and the file, which corresponds to the filename having not been traversed in the similar file list, in the software package of the old version and add the filenames of the files in the software packages of the old version and the new version as well as the filename of the difference file into the difference file list;

if the contents are consistent with each other, then continue to traverse the file list of the software package of the new version;

add the difference file list into the FOTA upgrade package after the filenames of the files in the software packages of the old version and the new version as well as the filename of the difference file have been added into the difference file list;

if traversing of the file list of the software package of the new version has been finished, then scan the filenames of the files in the software package of the old version to obtain a file list of the software package of the old version; and delete from the file list of the software package of the old version filenames which are the same as filenames in the old-and-new-coexisting list to obtain a deleted file list and adding the deleted file list into the FOTA upgrade package.

In one embodiment, the upgrade package generating module is specifically configured to:

if the filename having not been traversed does not exist in the similar file list, then add the file in the software package of the new version that corresponds to the filename having not been traversed into the FOTA upgrade package.

To solve the aforesaid technical problems, a fourth technical solution adopted in the present disclosure is: a mobile terminal for FOTA upgrading, comprising:

a decompressing module, being configured to decompress an FOTA upgrade package, wherein the FOTA upgrade package is generated by a server through determining whether a file in a software package of an old version has a same filename as a file in a software package of a new version and whether a file in the software package of the old version is similar to the file in the software package of the new version; and an upgrading module, being configured to use the decompressed FOTA upgrade package to upgrade the software from the old version to the new version. As compared to the prior art, the present disclosure has the following benefits: by determining whether a file having a same filename as a file in a software package of a new version exists in a software package of an old version, continuing to determine whether a file similar to the file in the software package of the new version exists in the software package of the old version if there is not a file having the same filename, and if there is a similar file, generating a difference file between the file in the software package of the old version and the file in the software package of the new version, the present disclosure can reduce the volume of the FOTA upgrade package and further reduce the traffic and time taken to download the FOTA upgrade package by a mobile terminal.

DETAILED DESCRIPTION OF THE INVENTION

Hereinbelow, technical solutions of embodiments of the present disclosure will be described clearly and completely with reference to the attached drawings. Obviously, embodiments described hereinbelow are only some of but not all of the embodiments of the present disclosure. All other embodiments that can be obtained without making any inventive efforts by those of ordinary skill in the art upon reviewing the embodiments of the present disclosure shall fall within the scope of the present disclosure.

Figure 1:
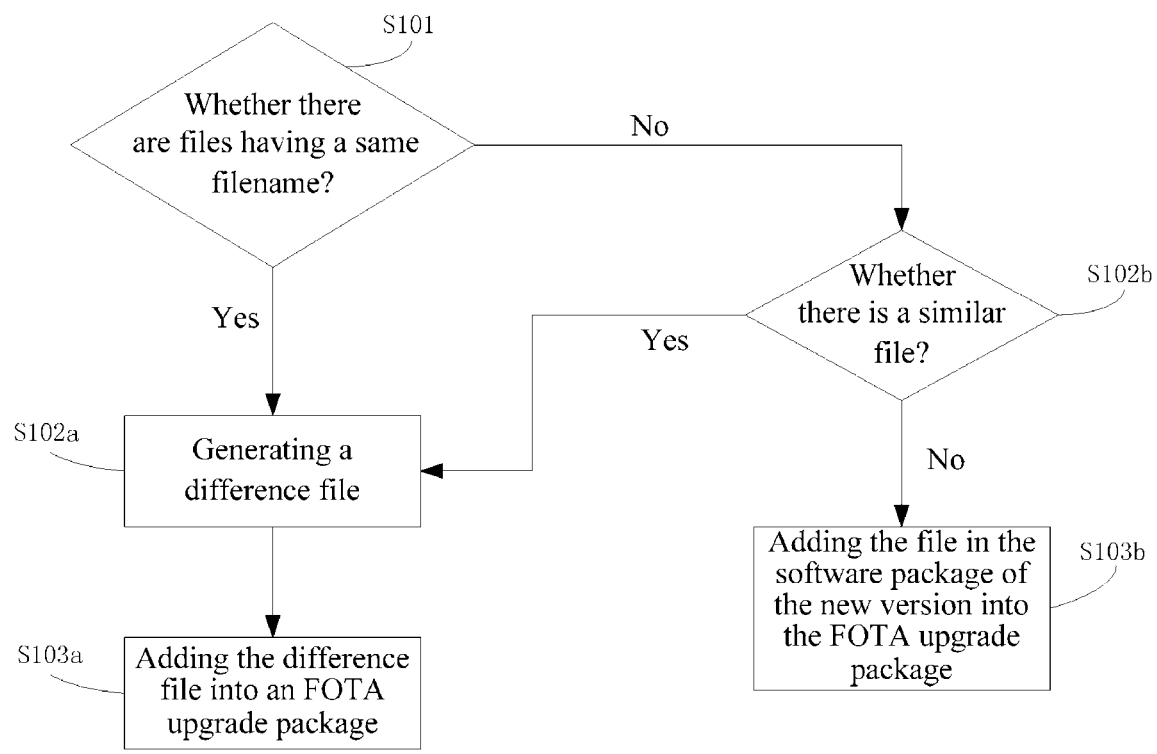
FIG. 1 is a flowchart diagram of a first embodiment of a method of generating a Firmware Over-The-Air (FOTA) upgrade package according to the present disclosure.

Referring to FIG. 1, a first embodiment of a method of generating a Firmware Over-The-Air (FOTA) upgrade package according to the present disclosure comprises:

Step S101: determining whether there are files having a same filename.

The server determines whether a file having a same filename as a file in a software package of a new version exists in a software package of an old version. The software package of the old version and the software package of the new version comprise resource files of various types, e.g., application files, picture files, sound files and so on.

Step S102a: generating a difference file.

If the determination result of the step S101 is that a file having a same filename as a file in the software package of the new version exists in the software package of the old version, then the server generates a difference file between the file in the software package of the old version and the file in the software package of the new version through specifically the following process: the server uses a bsdiff program and takes the file in the software package of the old version and the file in the software package of the new version as inputs to generate a corresponding difference file (i.e., a diff file or a patch file). For example, the software package of the old version comprises an application file a: /system/app/pre_load.apk (2000 kB), and the software package of the new version comprises an application file b: /system/app/pre_load.apk (2100 kB). Because the two application files a, b have the same filename, a corresponding difference file between the application files a and b is generated: /system/app/pre_load.apk.p (120 kB).

Step S103a: adding the difference file into an FOTA upgrade package.

After the difference file is generated, the server further adds the difference file into the FOTA upgrade package. The FOTA upgrade package is used to upgrade software of a mobile terminal from the old version of the software package into the new version of the software package.

Step S102b: determining whether there is a similar file.

If the determination result of the step S101 is that there is not a file having the same filename, then the server continues to determine whether a file similar to the file in the software package of the new version exists in the software package of the old version.

If the determination result of the step S102b is that a file similar to the file in the software package of the new version exists in the software package of the old version, then the server generates a difference file between the file in the software package of the old version and the file in the software package of the new version (i.e., executes the aforesaid step S102a); and the server further adds the generated difference file into the FOTA upgrade package (i.e., executes the aforesaid step S103a).

Step S103b: adding the file in the software package of the new version into the FOTA upgrade package.

If the determination result of the step S102b is that no file similar to the file in the software package of the new version exists in the software package of the old version, then the server adds the file in the software package of the new version into the FOTA upgrade package in a verbatim mode.

As can be appreciated, in the first embodiment of the method of generating an FOTA upgrade package according to the present disclosure, it is determined whether a file having a same filename as a file in a software package of a new version exists in a software package of an old version; if there is not a file having the same filename, it is further determined whether a file similar to the file in the software package of the new version exists in the software package of the old version; and if there is a similar file, a difference file between the file in the software package of the old version and the file in the software package of the new version is generated without the need of adding the whole file having a different filename but similar contents into the FOTA upgrade package. This can reduce the volume of the FOTA upgrade package and further reduce the traffic and time taken to download the FOTA upgrade package by a mobile terminal.

Figure 2:
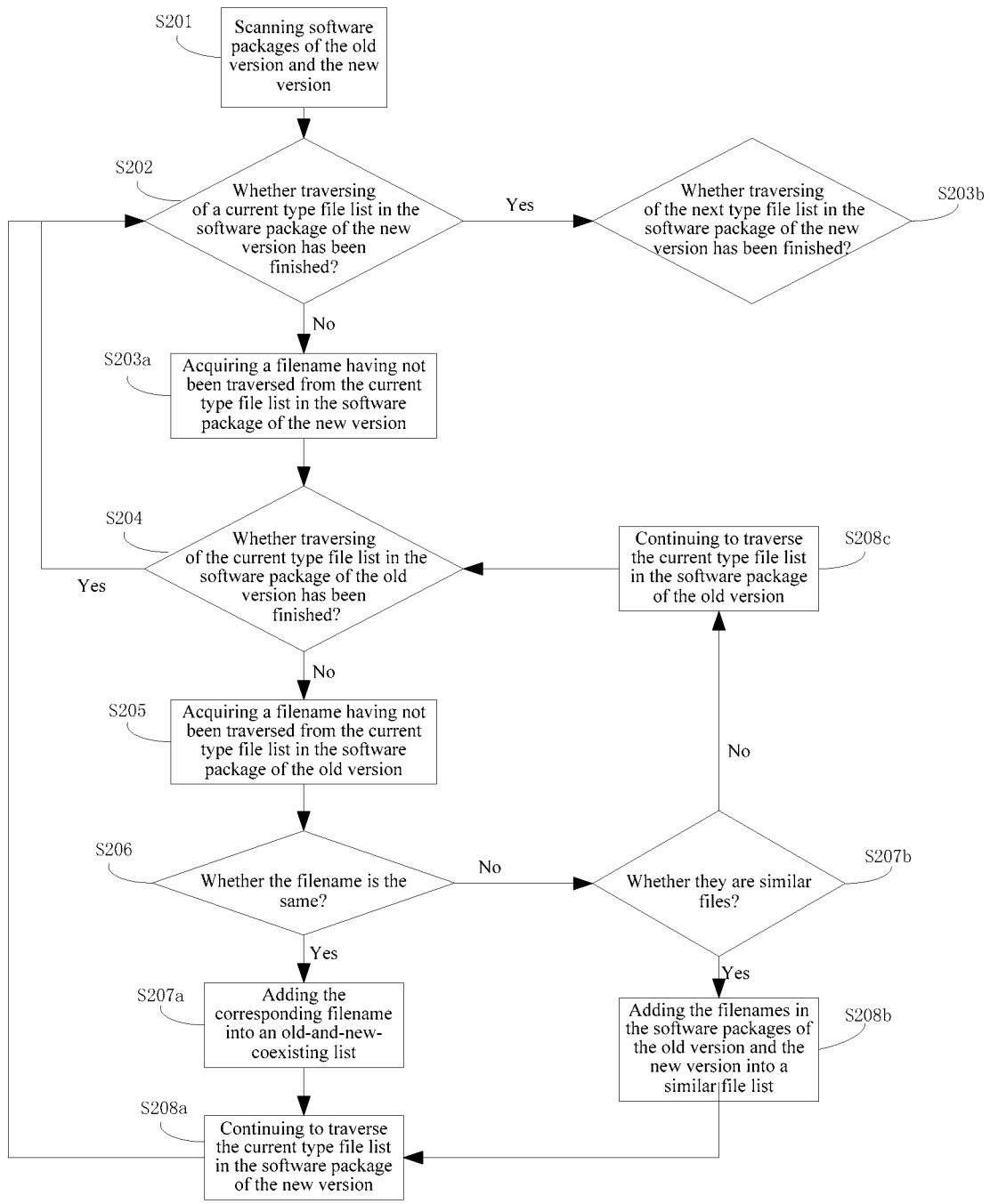
FIG. 2 is a flowchart diagram of a second embodiment of the method of generating an FOTA upgrade package according to the present disclosure.

Referring to FIG. 2, a second embodiment of the method of generating an FOTA upgrade package according to the present disclosure comprises:

Step S201: scanning the software package of the old version and the software package of the new version.

The server scans filenames and file attributes of files in the software package of the old version and the software package of the new version to obtain type file lists of the software package of the old version and type file lists of the software package of the new version. A same type file list in the software package of the old version or the software package of the new version comprises filenames of all files of a same type. The type file lists comprise various kinds of type file lists, including application file lists such as an apk type file list, picture file lists such as a jpeg type file list and a pgn type file list, sound file lists such as an mp3 type file list or the like. The apk type file list in the software package of the old version comprises all filenames of the apk type in the software package of the old version, and this is also the case for other type file lists. In other embodiments, a type file list also comprises paths corresponding to files.

Step S202: determining whether traversing of a current type file list in the software package of the new version has been finished.

The server determines whether traversing of the current type file list in the software package of the new version has been finished. The current type file list of the software package of the new version is a type file list that is, after traversing of a previous type file list of the software package of the new version has been finished, acquired from the remaining type file lists. Rather, the current type file list of the software package of the new version may be the apk type file list or the jpeg type file list described above or the like.

Step S203a: acquiring a filename having not been traversed from the current type file list in the software package of the new version.

If the determination result of the step S202 is that traversing of the current type file list in the software package of the new version has not been finished, the server acquires a filename N having not been traversed from the current type file list in the software package of the new version.

Step S204: determining whether traversing of the current type file list in the software package of the old version has been finished.

After the step S203a, the server determines whether the traversing of the current type file list in the software package of the old version has been finished, where the current type file list of the software package of the old version and the current type file list of the software package of the new version are of the same type.

If the traversing of the current type file list in the software package of the old version has been finished, then the server continues to determine whether traversing of the current type file list in the software package of the new version has been finished (i.e., executes the aforesaid step S202).

Step S205: acquiring a filename having not been traversed from the current type file list in the software package of the old version.

If the determination result of the step S204 is that the traversing of the current type file list in the software package of the old version has not been finished, then the server acquires a filename O having not been traversed from the current type file list in the software package of the old version.

Step S206: determining whether the filename is the same.

The server further determines whether the filename O having not been traversed that is acquired from the current type file list in the software package of the old version in the step S205 is the same as the filename N having not been traversed that is acquired from the current type file list in the software package of the new version in the step S203a.

Step S207a: adding the corresponding filename into an old-and-new-coexisting list.

If the determination result of the step S206 is that the filename O and the filename N are the same, then the server adds the filename corresponding to the filename O or the filename N into the old-and-new-coexisting list. The old-and-new-coexisting list comprises multiple sets of descriptions, and each set of descriptions comprises one filename that corresponds to a file existing both in the software package of the old version and in the software package of the new version. For example, if the filename O is pre.jpeg, and the filename N is pre.jpeg, then the two filenames are the same with each other; and in this case, pre.jpeg is added into the old-and-new-coexisting list.

Step S208a: continuing to traverse the current type file list in the software package of the new version.

After the corresponding filename has been added into the old-and-new-coexisting list, the server continues to traverse the current type file list in the software package of the new version.

Step S207b: determining whether there are similar files.

If the determination result of the step S206 is that the filename O having not been traversed that is acquired from the current type file list in the software package of the old version is not the same as the filename N having not been traversed that is acquired from the current type file list in the software package of the new version, then the server determines whether a file O1 corresponding to the filename O having not been traversed that is acquired from the current type file list in the software package of the old version is similar to the file N1 corresponding to the filename N having not been traversed that is acquired from the current type file list in the software package of the new version.

The step of determining, by the server, whether a file O1 corresponding to the filename O having not been traversed that is acquired from the current type file list in the software package of the old version is similar to the file N1 corresponding to the filename N having not been traversed that is acquired from the current type file list in the software package of the new version specifically comprises the following steps:

Step (1): generating, by the server, a difference file C between the file O1 corresponding to the filename O having not been traversed that is acquired from the current type file list in the software package of the old version and the file N1 corresponding to the filename N having not been traversed that is acquired from the current type file list in the software package of the new version.

Step (2): further acquiring, by the server, a file of a smaller volume from the file O1 corresponding to the filename O having not been traversed that is acquired from the current type file list in the software package of the old version and the file N1 corresponding to the filename N having not been traversed that is acquired from the current type file list in the software package of the new version. That is, a file S having a smaller volume is acquired from the file O1 and the file N1, where the file S is the file O1 or the file N1.

Step (3): determining, by the server, whether a difference in volume between the difference file C and the file S of the smaller volume is smaller than 50% of the file volume of the file S of the smaller volume, and if the answer is "yes", the file O1 and the file N1 are similar files, and otherwise, they are not similar files.

In other embodiments, before execution of the step (1), the following determination step is added for different type file lists in order to improve the efficiency of determining similar files:

1) if the current type file list of the software package of the new version in the step S202 is a picture (e.g., in the format of jpeg, png or the like) type file list, then before execution of the step (1), it is firstly determined whether a length and a width of a picture represented by the file O1 corresponding to the filename O having not been traversed that is acquired from the current type file list of the software package of the old version are the same as a length and a width of a picture represented by the file N1 corresponding to the filename N having not been traversed that is acquired from the current type file list of the software package of the new version. If they are not the same, then the file O1 is not similar to the file N1 and, therefore, it is unnecessary to execute the aforesaid step (1); and otherwise, if they are the same, then the aforesaid step (1) is executed.

2) if the current type file list of the software package of the new version in the step S202 is an application (e.g., in the format of apk or the like) type file list, then before execution of the step (1), it is firstly determined whether a package name of the file O1 corresponding to the filename O having not been traversed that is acquired from the current type file list of the software package of the old version is the same as a package name of the file N1 corresponding to the filename N having not been traversed that is acquired from the current type file list of the software package of the new version. If they are not the same, then the file O1 is not similar to the file N1 and, therefore, it is unnecessary to execute the aforesaid step (1); and otherwise, if they are the same, then the aforesaid step (1) is executed.

3) if the current type file list of the software package of the new version in the step S202 is a sound (e.g., in the format of mp3, ogg or the like) type file list, then before execution of the step (1), it is firstly determined whether a sound sampling rate and a sound sampling bit width of the file O1 corresponding to the filename O having not been traversed that is acquired from the current type file list of the software package of the old version are the same as a sound sampling rate and a sound sampling bit width of the file N1 corresponding to the filename N having not been traversed that is acquired from the current type file list of the software package of the new version. If they are not the same, then the file O1 is not similar to the file N1 and, therefore, it is unnecessary to execute the aforesaid step (1); and otherwise, if they are the same, then the aforesaid step (1) is executed.

Step S208b: adding the filename in the software package of the old version and the filename in the software package of the new version into a similar file list.

If the determination result in the step S207b is that the file O1 corresponding to the filename O and the file N1 corresponding to the filename N are similar files, then the server adds the filename O having not been traversed that is acquired from the current type file list in the software package of the old version and the filename N having not been traversed that is acquired from the current type file list in the software package of the new version into the similar file list. The similar file list comprises multiple sets of descriptions, each set of descriptions comprises one filename (e.g., the aforesaid filename N) corresponding to a file in the software package of the new version and one filename (e.g., the aforesaid filename O) corresponding to a file in the software package of the old version. The file N1 corresponding to the filename N and the file O1 corresponding to the filename O are files similar to each other, i.e., the two files have different filenames but similar contents.

After these filenames have been added into the similar file list, the server continues to traverse the current type file list in the software package of the new version (i.e., executes the aforesaid step S208a).

Step S208c: continuing to traverse the current type file list in the software package of the old version.

If the determination result of the step S207b is that the file O1 corresponding to the filename O and the file N1 corresponding to the filename N are not similar files, then the server continues to traverse the current type file list in the software package of the old version.

Step S203b: determining whether traversing of the next type file list in the software package of the new version has been finished.

If the determination result of the step S202 is that traversing of a current type file list in the software package of the new version has not been finished, then the server continues to determine whether the traversing of the next type file list in the software package of the new version has been finished. The same processing as the current type file list is carried out on the next type file list until processing on all type file lists is finished.

Here, the aforesaid steps S201, S202, S203a, S203b, S204, S205, S206, S207a, S208a are sub-steps of the step of determining, by the server, whether a file having a same filename as a file in a software package of a new version exists in a software package of an old version (i.e., the aforesaid step S101) in the first embodiment of the method of generating an FOTA upgrade package according to the present disclosure; and the aforesaid steps S207b, S208a, S208b, S208c are sub-steps of the step of determining whether a file similar to the file in the software package of the new version exists in the software package of the old version (i.e., the aforesaid step S102b) in the first embodiment of the method of generating an FOTA upgrade package according to the present disclosure.

As can be appreciated, in the second embodiment of the method of generating an FOTA upgrade package according to the present disclosure, by determining whether files in the type file lists of the software packages of the old version and the new version have the same filenames or are similar files, the old-and-new-coexisting list and the similar file list are obtained and used to generate the FOTA upgrade package. This can reduce the volume of the FOTA upgrade package and further reduce the traffic and time taken to download the FOTA upgrade package by a mobile terminal.

Figure 3:
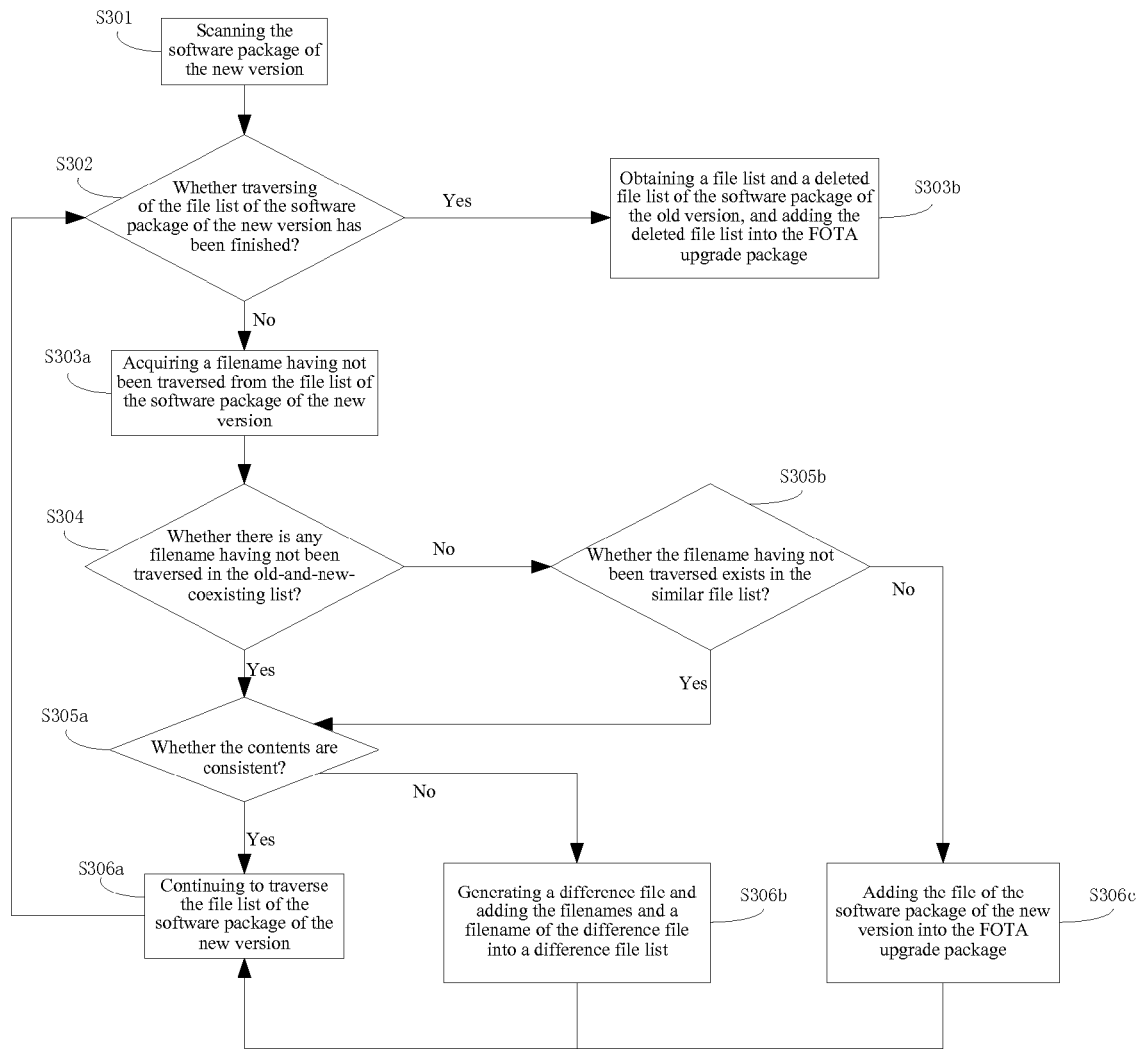
FIG. 3 is a flowchart diagram of a third embodiment of the method of generating an FOTA upgrade package according to the present disclosure.

Referring to FIG. 3, a third embodiment of the method of generating an FOTA upgrade package according to the present disclosure comprises:

Step S301: scanning the software package of the new version.

The server scans filenames of files in the software package of the new version to obtain a file list of the software package of the new version. The file list of the software package of the new version comprises filenames of all files in the software package of the new version. In other embodiments, the file list of the software package of the new version also comprises paths of the files.

Step S302: determining whether traversing of the file list of the software package of the new version has been finished.

The server determines whether the traversing of the file list of the software package of the new version obtained in the step S301 has been finished.

Step S303a: acquiring a filename having not been traversed from the file list of the software package of the new version.

If the determination result of the step S302 is that the traversing of the file list of the software package of the new version has not been finished, then the server acquires a filename M having not been traversed from the file list of the software package of the new version.

Step S303b: obtaining a file list and a deleted file list of the software package of the old version, and adding the deleted file list into the FOTA upgrade package.

If the determination result of the step S302 is that the traversing of the file list of the software package of the new version has been finished, then the server scans filenames of files in the software package of the old version to obtain the file list of the software package of the old version. The file list of the software package of the old version comprises filenames of all files in the software package of the old version. In other embodiments, the file list of the software package of the old version also comprises paths of the files.

The server deletes from the file list of the software package of the old version filenames which are the same as filenames in the old-and-new-coexisting list obtained in the second embodiment of the method of generating an FOTA upgrade package according to the present disclosure to obtain the deleted file list, and adds the deleted file list into the FOTA upgrade package by the server.

Step S304: determining whether there is any filename having not been traversed in the old-and-new-coexisting list.

After execution of the step S303a, the server determines whether the filename M having not been traversed that is acquired in the step S303a exists in the old-and-new-coexisting list obtained in the second embodiment of the method of generating an FOTA upgrade package according to the present disclosure.

Step S305a: determining whether the contents are consistent.

If the determination result of the step S304 is that the filename M having not been traversed that is acquired in the step S303a exists in the old-and-new-coexisting list, then the server determines whether contents of the file MO corresponding to the filename M in the software package of the old version are consistent with contents of the file MN corresponding to the filename M in the software package of the new version.

Step S306a: continuing to traverse the file list of the software package of the new version.

If the determination result of the step S305a is that the contents of the file MO and the contents of the file MN are consistent with each other, then the server continues to traverse the file list of the software package of the new version.

Step S306b: generating a difference file and adding the filenames and a filename of the difference file into a difference file list.

If the determination result of the step S305a is that the contents of the file MO and the contents of the file MN are inconsistent with each other, then the server generates a difference file P between the file MO corresponding to the filename M in the software package of the old version and the file MN corresponding to the filename M in the software package of the new version, and adds the filename of the file MO in the software package of the old version, the filename of the file MN in the software package of the new version and the filename of the difference file into the difference file list.

Additionally, after the difference file P has been obtained, the difference file P is added into the FOTA upgrade package.

Step S305b: determining whether the filename having not been traversed exists in the similar file list.

If the determination result of the step S304 is that the filename M having not been traversed that is acquired as described above does not exist in the old-and-new-coexisting list, then the server determines whether the filename M having not been traversed that is acquired in the step S303a exists in the similar file list obtained in the second embodiment of the method of generating an FOTA upgrade package according to the present disclosure.

Step S306c: adding the file of the software package of the new version into the FOTA upgrade package.

If the determination result of the step S305b is that the filename M having not been traversed that is acquired as described above does not exists in the similar file list, then the server adds the file MN in the software package of the new version that corresponds to the filename M having not been traversed into the FOTA upgrade package in a verbatim mode.

Additionally, if the determination result of the step S305b is that the filename M having not been traversed that is acquired as described above exists in the similar file list, then the server determines whether contents of the file MN in the software package of the new version that corresponds to the filename M having not been traversed in the similar file list are consistent with contents of the file MO in the software package of the old version that corresponds to the filename M having not been traversed in the similar file list; and if the contents of the file MN and the contents of the file MO are inconsistent with each other, then the server generates a difference file P between the file MN in the software package of the new version that corresponds to the filename M having not been traversed in the similar file list and the file MO in the software package of the old version that corresponds to the filename M having not been traversed in the similar file list, and adds the filename of the file MO in the software package of the old version, the filename of the file MN in the software package of the new version and the filename of the difference file P into the difference file list. After the difference file P is obtained, the difference file P is added into the FOTA upgrade package. If the contents of the file MN and the contents of the file MO are consistent with each other, then the server continues to traverse the file list of the software package of the new version (i.e., executes the step S306a).

After the filenames of the files in the software package of the old version and the software package of the new version as well as the filename of the difference file have been added into the difference file list, the server adds the difference file list into the FOTA upgrade package. At this point, the FOTA upgrade package comprises a difference file list, a deleted file list, difference files, and files in the software package of the new version that are added in a verbatim mode.

The aforesaid steps S301, S302, S303a, S304, S305a, S306a, S306b are sub-steps of the step of generating, by the server, a difference file between the file in the software package of the old version and the file in the software package of the new version when the two files have a same filename (i.e., sub-steps of the step S102a when the determination result of the step S101 is that there are files having the same filename) in the first embodiment of the method of generating an FOTA upgrade package according to the present disclosure; the aforesaid steps S305b, S305a, S306a, S306b are sub-steps of the step of generating, by the server, a difference file between the file in the software package of the old version and the file in the software package of the new version when the two files are similar to each other (i.e., sub-steps of the step S102a when the determination result of the step S102b is that there are files similar to each other) in the first embodiment of the method of generating an FOTA upgrade package according to the present disclosure; and the aforesaid step S306c is an action specifically included in the step of adding the file in the software package of the new version into the FOTA upgrade package (i.e., the step S103b) in the first embodiment of the method of generating an FOTA upgrade package according to the present disclosure.

As can be appreciated, in the third embodiment of the method of generating an FOTA upgrade package according to the present disclosure, by determining whether a file in the software package of the new version exists in the old-and-new-coexisting list or in the similar file list to find a file having the same filename or a similar file, a difference file is generated and then an FOTA upgrade package can be finally generated. This can reduce the volume of the FOTA upgrade package and further reduce the traffic and time taken to download the FOTA upgrade package by a mobile terminal.

Figure 4:
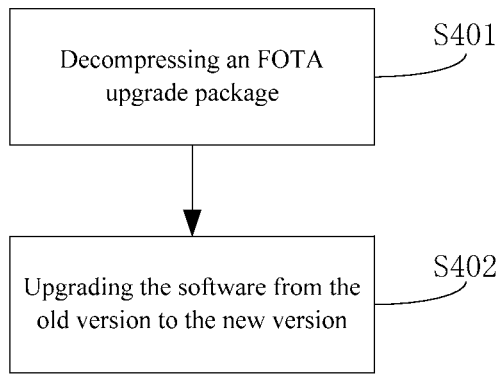
FIG. 4 is a flowchart diagram of an embodiment of an FOTA upgrading method according to the present disclosure.

Referring to FIG. 4, an embodiment of an FOTA upgrading method according to the present disclosure comprises:

Step S401: decompressing an FOTA upgrade package.

The mobile terminal decompresses an FOTA upgrade package to obtain a difference file list, a deleted file list, difference files, and files in the software package of the new version that are added in a verbatim mode. Here, the FOTA upgrade package is generated by a server through determining whether a file in a software package of an old version has a same filename as a file in a software package of a new version and whether a file in the software package of the old version is similar to the file in the software package of the new version.

Step S402: upgrading the software from the old version to the new version.

The mobile terminal uses the decompressed FOTA upgrade package to upgrade the software from the old version to the new version.

Figure 5:
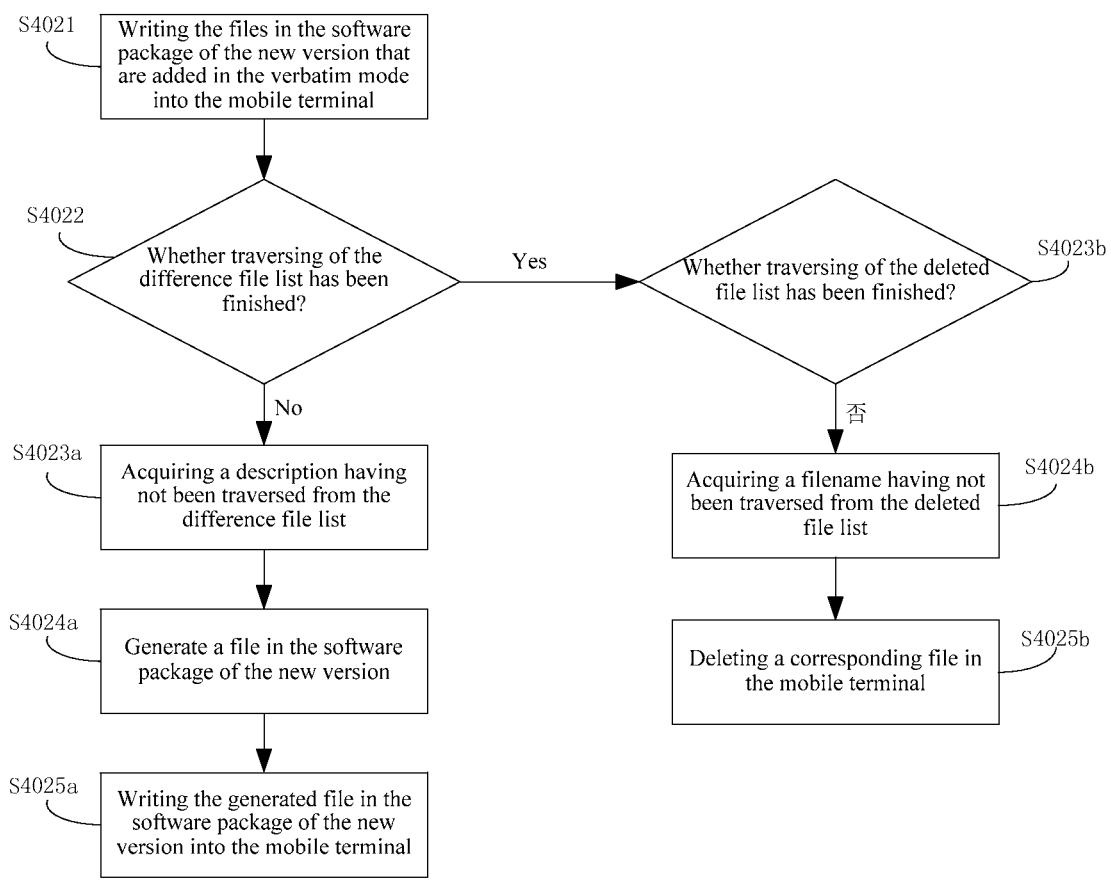
FIG. 5 is a flowchart diagram illustrating upgrading of software from an old version to a new version in an embodiment of the FOTA upgrading method according to the present disclosure.

Referring to FIG. 5, upgrading of the software from the old version to the new version in an embodiment of the FOTA upgrading method according to the present disclosure specifically comprises the following sub-steps:

Sub-step S4021: writing the files in the software package of the new version that are added in the verbatim mode into the mobile terminal The mobile terminal writes the files in the software package of the new version added in the verbatim mode, which are obtained through decompressing the FOTA upgrade package, into the mobile terminal. Specifically, the files are burned into a corresponding sector of a memory of the mobile terminal Sub-step S4022: determining whether traversing of the difference file list has been finished.

The mobile terminal determines whether traversing of the difference file list, which is obtained through decompressing the FOTA upgrade package, has been finished.

Sub-step S4023a: acquiring a description having not been traversed from the difference file list.

If the determination result of the sub-step S4022 is that the traversing of the difference file list has not been finished, then the mobile terminal acquires a description having not been traversed from the difference file list. The description having not been traversed specifically comprises a filename of one file in the software package of the new version, a filename of one file in the software package of the old version, a filename of one difference file, and associated check codes.

Sub-step S4024a: generating a file in the software package of the new version.

The mobile terminal generates a file in the software package of the new version by using the description having not been traversed that is acquired from the difference file list (i.e., according to the file of the software package of the old version that is stored in the mobile terminal and the difference file).

Sub-step S4025a: writing the generated file in the software package of the new version into the mobile terminal The mobile terminal writes the generated file in the software package of the new version into the mobile terminal. Specifically, the file is burned into a corresponding sector of a memory of the mobile terminal Sub-step S4023b: determining whether traversing of the deleted file list has been finished.

If the determination result of the sub-step S4022 is that the traversing of the difference file list has been finished, then the mobile terminal determines whether traversing of the deleted file list has been finished.

Sub-step S4024b: acquiring a filename having not been traversed from the deleted file list.

If the determination result of the sub-step S4023b is that the traversing of the deleted file list has not been finished, then the mobile terminal acquires a filename having not been traversed from the deleted file list.

Sub-step S4025b: deleting a corresponding file in the mobile terminal

The mobile terminal deletes a file stored in the mobile terminal, which corresponds to the filename having not been traversed that is acquired from the deleted file list, from the mobile terminal As can be appreciated, the embodiment of the FOTA upgrading method according to the present disclosure upgrades the software by using a decompressed FOTA upgrade package, where the FOTA upgrade package is generated by a server through determining whether a file in a software package of an old version has a same filename as a file in a software package of a new version and whether a file in the software package of the old version is similar to the file in the software package of the new version. Using the FOTA upgrade package of a smaller volume to upgrade the software can reduce the traffic and time taken by the mobile terminal to download the FOTA upgrade package, and can improve the efficiency of decompressing the FOTA upgrade package by the mobile terminal.

Figure 6:
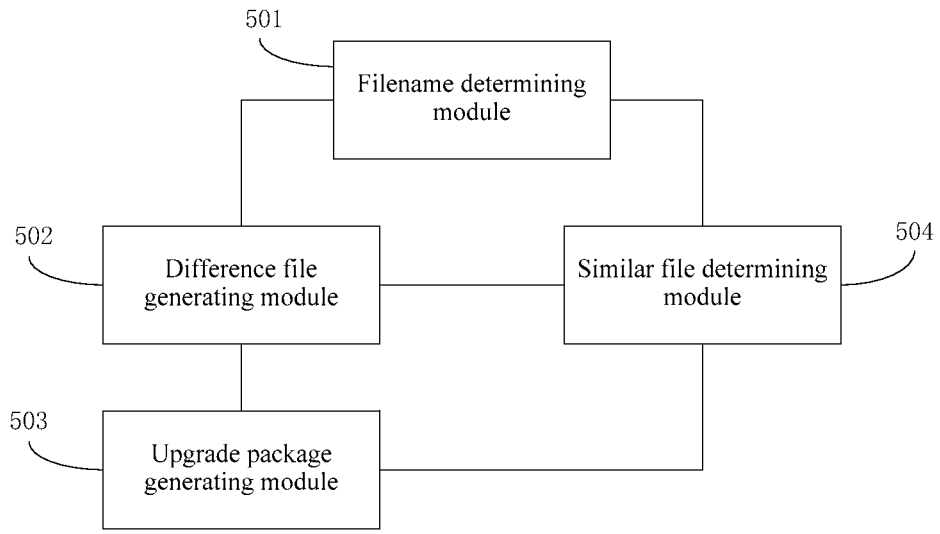
FIG. 6 is a schematic block diagram of an embodiment of a server for generating an FOTA upgrade package according to the present disclosure.

Referring to FIG. 6, an embodiment of a server for generating an FOTA upgrade package according to the present disclosure comprises:

a filename determining module 501, being configured to determine whether a file having a same filename as a file in a software package of a new version exists in a software package of an old version;

a difference file generating module 502, being configured to, if there is a file having the same filename, generate a difference file between the file in the software package of the old version and the file in the software package of the new version;

an upgrade package generating module 503, being configured to add the difference file into the FOTA upgrade package; and a similar file determining module 504, being configured to, if there is not a file having the same filename, determine whether a file similar to the file in the software package of the new version exists in the software package of the old version;

the difference file generating module 502 is further configured to, if there is a similar file, generate a difference file between the file in the software package of the old version and the file in the software package of the new version, the upgrade package generating module 503 is further configured to add the difference file into the FOTA upgrade package, and the upgrade package generating module 503 is further configured to, if there is not a similar file, add the file in the software package of the new version into the FOTA upgrade package, wherein the FOTA upgrade package is used to upgrade software of a mobile terminal from the old version of the software package into the new version of the software package.

Figure 7:
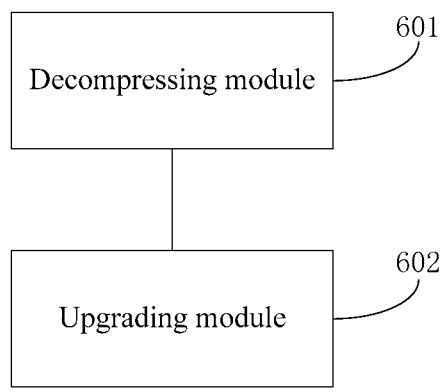
FIG. 7 is a schematic block diagram of an embodiment of a mobile terminal for FOTA upgrading according to the present disclosure.

Referring to FIG. 7, an embodiment of a mobile terminal for FOTA upgrading according to the present disclosure comprises:

a decompressing module 601, being configured to decompress an FOTA upgrade package, wherein the FOTA upgrade package is generated by a server through determining whether a file in a software package of an old version has a same filename as a file in a software package of a new version and whether a file in the software package of the old version is similar to the file in the software package of the new version; and an upgrading module 602, being configured to use the decompressed FOTA upgrade package to upgrade the software from the old version to the new version.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A method of generating a Firmware Over-The-Air (FOTA) upgrade package, comprising the following steps of:
    determining, by a server, whether a first file in a software package of an old version has a same filename as that of a second file in a software package of a new version by scanning, by the server, filenames and file attributes of files in the software package of the old version and the software package of the new version to obtain type file lists of the software package of the old version and type file lists of the software package of the new version, wherein each of the type file lists comprises filenames of files of a same type;
    when the first file has the same filename as that of the second file, then generating, by the server, a first difference file between the first file in the software package of the old version and the second file in the software package of the new version and adding, by the server, the first difference file into the FOTA upgrade package;
    and when the first file doesn't have the same filename as that of the second file, then continuing to determine whether the first file in the software package of the old version is similar to the second file in the software package of the new version, a determination of whether the existing file in the old version is similar to the file in the new version being made by determining whether the existing file and the file in the new version are of the same type and whether a difference between a volume of the difference file and a volume of either the existing file or the file in the new version, whichever is smaller, is smaller than a predetermined value; and
    when the first file is similar to the second file, then generating, by the server, a second difference file between the first file in the software package of the old version and the second file in the software package of the new version and adding, by the server, the second difference file into the FOTA upgrade package; and when the first file is not similar to the second file, then adding the second file in the software package of the new version into the FOTA upgrade package, wherein the FOTA upgrade package is used to upgrade software of a mobile terminal from the old version of the software package into the new version of the software package.

2. The method of claim 1, wherein the step of determining, by the server, whether the first file in the software package of the old version has the same filename as that of the second file in the software package of the new version specifically comprises the following steps of:

determining, by the server, whether traversing of a current type file list in the software package of the new version has been finished; and when the answer is "yes", continuing to determine whether traversing of a next type file list in the software package of the new version has been finished, and otherwise, when the answer is "no", acquiring a filename having not been traversed from the current type file list in the software package of the new version;

determining, by the server, whether traversing of a current type file list in the software package of the old version has been finished; and when the answer is "yes", continuing to determine whether traversing of the current type file list in the software package of the new version has been finished, and otherwise, when the answer is "no", acquiring a first filename having not been traversed from the current type file list in the software package of the old version and determining whether the first filename is the same as the second filename having not been traversed that is acquired from the current type file list in the software package of the new version, and when the filenames are the same, then adding the corresponding filename into an old-and-new-coexisting list; and continuing to traverse the current type file list in the software package of the new version by the server after the corresponding filename has been added into the old-and-new-coexisting list.

3. The method of claim 2, wherein the step of determining whether the first file in the software package of the old version is similar to the second file in the software package of the new version specifically comprises the following steps of:

when the first filename having not been traversed that is acquired from the current type file list in the software package of the old version is not the same as the second filename having not been traversed that is acquired from the current type file list in the software package of the new version, then determining whether the first file corresponding to the first filename having not been traversed that is acquired from the current type file list in the software package of the old version is similar to the second file corresponding to the second filename having not been traversed that is acquired from the current type file list in the software package of the new version;

when the first file is similar to the second file, then adding, by the server, the first filename having not been traversed that is acquired from the current type file list in the software package of the old version and the second filename having not been traversed that is acquired from the current type file list in the software package of the new version into a similar file list;

continuing to traverse the current type file list in the software package of the new version by the server after the filenames have been added into the similar file list; and when the first file is not similar to the second file, then continuing to traverse the current type file list in the software package of the old version by the server.

4. The method of claim 3, wherein the step of determining whether the first file corresponding to the first filename having not been traversed that is acquired from the current type file list in the software package of the old version is similar to the second file corresponding to the second filename having not been traversed that is acquired from the current type file list in the software package of the new version specifically comprises the following steps of:

generating, by the server, the second difference file between the first file corresponding to the first filename having not been traversed that is acquired from the current type file list in the software package of the old version and the second file corresponding to the second filename having not been traversed that is acquired from the current type file list in the software package of the new version;

further acquiring, by the server, a file of a smaller volume from the first file corresponding to the first filename having not been traversed that is acquired from the current type file list in the software package of the old version and the second file corresponding to the second filename having not been traversed that is acquired from the current type file list in the software package of the new version; and determining, by the server, whether a difference in volume between the second difference file and the file of the smaller volume is smaller than 50% of the file volume of the file of the smaller volume, and when the answer is "yes", the first and second files are similar files, and otherwise, they are not similar files.

5. The method of claim 4, wherein the step of, when the first file has the same filename as that of the second file, then generating, by the server, the first difference file between the first file in the software package of the old version and the second file in the software package of the new version specifically comprises the following steps of:

scanning, by the server, filenames of files in the software package of the new version to obtain a file list of the software package of the new version;

determining, by the server, whether traversing of the file list of the software package of the new version has been finished, and when the answer is "no", then acquiring, by the server, a second filename having not been traversed from the file list of the software package of the new version;

further determining, by the server, whether the second filename having not been traversed exists in the old-and-new-coexisting list; and when the second filename having not been traversed exists in the old-and-new-coexisting list, then determining, by the server, whether contents of the first file corresponding to the first filename in the software package of the old version are consistent with contents of the second file corresponding to the second filename in the software package of the new version, and when the contents are inconsistent with each other, then generating the first difference file between the first file corresponding to the first filename in the software package of the old version and the second file corresponding to the second filename in the software package of the new version and adding the filenames of the files in the software packages of the old version and the new version as well as a filename of the first difference file into the difference file list; and continuing to traverse the file list of the software package of the new version when the contents are consistent with each other.

6. The method of claim 5, wherein the step of, when the first file is similar to the second file, then generating, by the server, the second difference file between the first file in the software package of the old version and the second file in the software package of the new version specifically comprises the following steps of:

when the second filename having not been traversed does not exist in the old-and-new-coexisting list, then determining, by the server, whether the second filename having not been traversed exists in the similar file list;

when the second filename having not been traversed exists in the similar file list, then determining, by the server, whether contents of the second file, which corresponds to the second filename having not been traversed in the similar file list, in the software package of the new version are consistent with contents of the first file, which corresponds to the first filename having not been traversed in the similar file list, in the software package of the old version, and when the contents are inconsistent with each other, then generating the second difference file between the second file, which corresponds to the second filename having not been traversed in the similar file list, in the software package of the new version and the first file, which corresponds to the first filename having not been traversed in the similar file list, in the software package of the old version and adding the filenames of the files in the software packages of the old version and the new version as well as the filename of the second difference file into the difference file list;

when the contents are consistent with each other, then continuing to traverse the file list of the software package of the new version;

adding the difference file list into the FOTA upgrade package by the server after the filenames of the files in the software packages of the old version and the new version as well as the filename of the second difference file have been added into the difference file list;

when traversing of the file list of the software package of the new version has been finished, then scanning the filenames of the files in the software package of the old version by the server to obtain the file list of the software package of the old version; and deleting from the file list of the software package of the old version filenames which are the same as filenames in the old-and-new-coexisting list to obtain a deleted file list and adding the deleted file list into the FOTA upgrade package by the server.

7. The method of claim 6, wherein the step of adding the second file in the software package of the new version into the FOTA upgrade package specifically comprises:

when the second filename having not been traversed does not exist in the similar file list, then adding the second file in the software package of the new version that corresponds to the second filename having not been traversed into the FOTA upgrade package.

8. A server for generating an FOTA upgrade package, comprising:

a filename determining module, being stored in a memory and configured to determine whether a first file in a software package of an old version has a same filename as that of a second file in a software package of a new version by scanning filenames and file attributes of files in the software package of the old version and the software package of the new version to obtain type file lists of the software package of the old version and type file lists of the software package of the new version, wherein each of the type file lists comprises filenames of files of a same type;

a difference file generating module, being configured to, when the first file has a same filename as that of the second file, generate a first difference file between the first file in the software package of the old version and the second file in the software package of the new version;

an upgrade package generating module, being configured to add the first difference file into the FOTA upgrade package; and a similar file determining module, being configured to, when the first file doesn't have the same filename as that of the second file, determine whether the first file in the software package of the old version is similar to the second file in the software package of the new version, a determination of whether the existing file in the old version is similar to the file in the new version being made by determining whether the existing file and the file in the new version are of the same type and whether a difference between a volume of the difference file and a volume of either the existing file or the file in the new version, whichever is smaller, is smaller than a predetermined value;

the difference file generating module is further configured to, when the first file is similar to the second file, generate a second difference file between the first file in the software package of the old version and the second file in the software package of the new version, the upgrade package generating module is further configured to add the second difference file into the FOTA upgrade package, the upgrade package generating module is further configured to, when the first file is not similar to the second file, add the second file in the software package of the new version into the FOTA upgrade package, wherein the FOTA upgrade package is used to upgrade software of the mobile terminal from the old version of the software package into the new version of the software package.

9. The server of claim 8, wherein the filename determining module is specifically configured to:

determine whether traversing of a current type file list in the software package of the new version has been finished; and when the answer is "yes", continue to determine whether traversing of a next type file list in the software package of the new version has been finished, and otherwise, when the answer is "no", acquire a second filename having not been traversed from the current type file list in the software package of the new version;

determine whether traversing of the current type file list in the software package of the old version has been finished; and when the answer is "yes", continue to determine whether traversing of the current type file list in the software package of the new version has been finished, and otherwise, when the answer is "no", acquire a first filename having not been traversed from the current type file list in the software package of the old version and determine whether the first filename is the same as the second filename having not been traversed that is acquired from the current type file list in the software package of the new version, and when the first filename is the same as the second filename, then add the corresponding filename into an old-and-new-coexisting list; and continue to traverse the current type file list in the software package of the new version after the corresponding filename has been added into the old-and-new-coexisting list.

10. The server of claim 8, wherein the similar file determining module is specifically configured to:

when the first filename having not been traversed that is acquired from the current type file list in the software package of the old version is not the same as the second-filename having not been traversed that is acquired from the current type file list in the software package of the new version, then determine whether a first file corresponding to the first filename having not been traversed that is acquired from the current type file list in the software package of the old version is similar to the second file corresponding to the second filename having not been traversed that is acquired from the current type file list in the software package of the new version;

when the first file is similar to the second file, then add the first filename having not been traversed that is acquired from the current type file list in the software package of the old version and the second filename having not been traversed that is acquired from the current type file list in the software package of the new version into a similar file list;

continue to traverse the current type file list in the software package of the new version after the filenames have been added into the similar file list; and when the first file is not similar to the second file, then continue to traverse the current type file list in the software package of the old version.

11. The server of claim 10, wherein the similar file determining module is specifically further configured to:

generate a second difference file between the first file corresponding to the first filename having not been traversed that is acquired from the current type file list in the software package of the old version and the second file corresponding to the second filename having not been traversed that is acquired from the current type file list in the software package of the new version;

further acquire a file of a smaller volume from the first file corresponding to the first filename having not been traversed that is acquired from the current type file list in the software package of the old version and the second file corresponding to the second filename having not been traversed that is acquired from the current type file list in the software package of the new version; and determine whether a difference in volume between the second difference file and the file of the smaller volume is smaller than 50% of the file volume of the file of the smaller volume, and when the answer is "yes", the files are similar files, and otherwise, they are not similar files.

12. The server of claim 10, wherein the difference file generating module is specifically further configured to:

scan filenames of files in the software package of the new version to obtain a file list of the software package of the new version;

determine whether traversing of the file list of the software package of the new version has been finished, and when the answer is "no", then acquire the second filename having not been traversed from the file list of the software package of the new version;

further determine whether the second filename having not been traversed exists in the old-and-new-coexisting list;

and when the second filename having not been traversed exists in the old-and-new-coexisting list, then determine whether contents of the first file corresponding to the first filename in the software package of the old version are consistent with contents of the second file corresponding to the second filename in the software package of the new version, and when the contents are inconsistent with each other, then generate a first difference file between the first file corresponding to the first filename in the software package of the old version and the second file corresponding to the second filename in the software package of the new version and add the filenames of the files in the software packages of the old version and the new version as well as a filename of the first difference file into a difference file list; and continue to traverse the file list of the software package of the new version if the contents are consistent with each other.

13. The server of claim 12, wherein the difference file generating module is specifically configured to:

when the second filename having not been traversed does not exist in the old-and-new-coexisting list, then determine whether the second filename having not been traversed exists in the similar file list;

when the second filename having not been traversed exists in the similar file list, then determine whether contents of the second file, which corresponds to the second filename having not been traversed in the similar file list, in the software package of the new version are consistent with contents of the first file, which corresponds to the first filename having not been traversed in the similar file list, in the software package of the old version, and when the contents are inconsistent with each other, then generate a second difference file between the second file, which corresponds to the second filename having not been traversed in the similar file list, in the software package of the new version and the first file, which corresponds to the first filename having not been traversed in the similar file list, in the software package of the old version and add the filenames of the files in the software packages of the old version and the new version as well as the filename of the second difference file into the difference file list;

when the contents are consistent with each other, then continue to traverse the file list of the software package of the new version;

add the difference file list into the FOTA upgrade package after the filenames of the files in the software packages of the old version and the new version as well as the filename of the second difference file have been added into the difference file list;

when traversing of the file list of the software package of the new version has been finished, then scan the filenames of the files in the software package of the old version to obtain a file list of the software package of the old version; and delete from the file list of the software package of the old version filenames which are the same as filenames in the old-and-new-coexisting list to obtain a deleted file list and adding the deleted file list into the FOTA upgrade package.

14. The server of claim 13, wherein the upgrade package generating module is specifically configured to:

when the second filename having not been traversed does not exist in the similar file list, then add the second file in the software package of the new version that corresponds to the second filename having not been traversed into the FOTA upgrade package.

15. The method of claim 1, wherein the first or the second difference file is generated by the server according to a differential algorithm.

* * * * *